No. 752,384. PATENTED FEB. 16, 1904.
W. E. DOW.
ELECTRICAL IGNITER FOR EXPLOSIVE ENGINES.
APPLICATION FILED JULY 2, 1903.
NO MODEL.
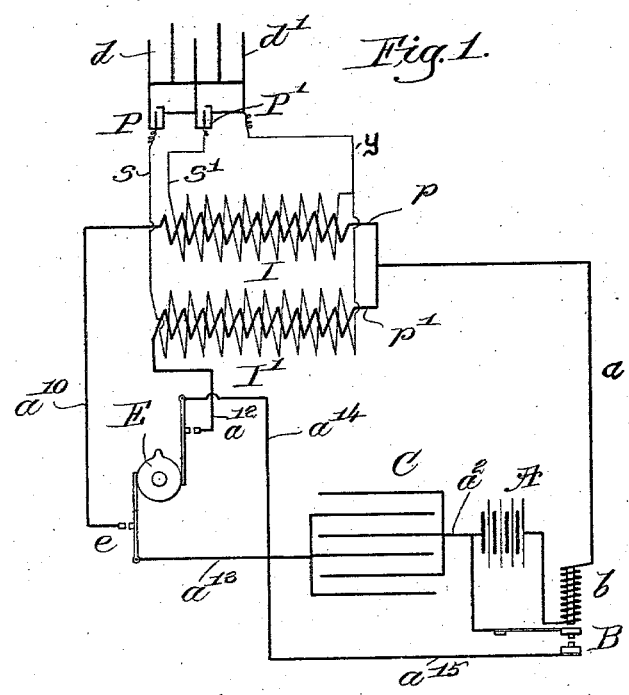
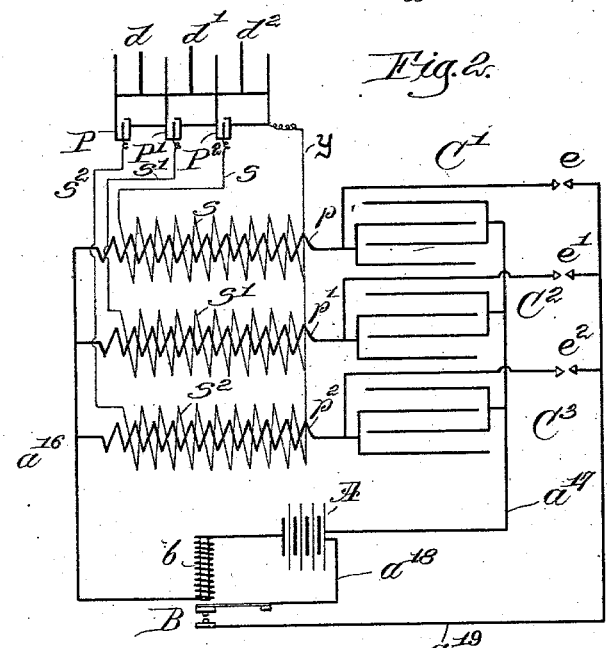
Witnesses:
Thomas J. Drummond
Warren D. Owen
Inventor.
Willard E. Dow,
by Crosby & Gregory
Attys.

No. 752,384.

Patented February 16, 1904.

UNITED STATES PATENT OFFICE.

WILLARD E. DOW, OF BRAINTREE, MASSACHUSETTS.

ELECTRICAL IGNITER FOR EXPLOSIVE-ENGINES.

SPECIFICATION forming part of Letters Patent No. 752,384, dated February 16, 1904.

Application filed July 2, 1903. Serial No. 163,993. (No model.)

*To all whom it may concern:*

Be it known that I, WILLARD E. DOW, a citizen of the United States, residing at Braintree, in the county of Norfolk and State of Massachusetts, have invented an Improvement in Electrical Igniters for Explosive-Engines, of which the following description, in connection with the accompanying drawings, is a specification, like letters on the drawings representing like parts.

My present invention is of the same general class as that contained in my Patent No. 728,882, dated May 26, 1903, and has for its object the dissimultaneous operation of a number of induction-coils from one vibrator or electrical interrupter and one battery and also, preferably, from one condenser, for use, for example, with a gas-engine having two or more cylinders.

The advantages of my invention are illustrated best in connection with automobile or similar gas-engines containing a plurality of cylinders operated by spark-plugs, where under the old system a separate electric vibrator would be required for each coil and plug, this being not only expensive, but uncertain and irregular in operation, owing to the difficulty in causing the vibrators to operate with the same rapidity, thereby giving unsteady operation from the engine, whereas by my invention I insure absolute uniformity by operating all the coils and plugs from the same vibrator. Besides this chief advantage this eliminates considerable complication and expense in having a distinct set of apparatus for each induction-coil.

In the drawings, Figure 1 is a diagrammatic view showing a preferred form of my invention applied to a two-cylinder engine device. Fig. 2 is a similar view of a modification applied to a three-cylinder engine.

It will be understood that my invention is applicable to an engine having any number of cylinders, as two, three, four, &c., and for convenience I have shown one form of the invention, in Fig. 1, applied to two cylinders and another form thereof, in Fig. 2, applied to three cylinders, this being simply for convenience of illustration and explanation.

Referring to Fig. 1, I have indicated diagrammatically at $d$ $d'$ two cylinders provided, respectively, with spark-plugs P P', which may be of the kind shown more in detail in my before-mentioned patent, and connected therewith, respectively, are one end of the secondaries of two induction-coils I I', the other ends of the secondaries being grounded, if desired, on any part of the engine. The primaries $p$ $p'$ of said coils are connected at one end by a wire $a$ to a battery or other source of energy A and thence by a wire $a^2$ from the other pole of the battery to one end of a condenser C, while the opposite ends of said coils are connected, respectively, by wires $a^{10}$ $a^{12}$ to interrupters $e$ $e'$, which may be operated dissimultaneously by a cam E. Said interrupters are connected by wires $a^{13}$ $a^{14}$ to the other end of the condenser C, which is also connected by a wire $a^{15}$ to a vibrator B, shown as operated by an electromagnet $b$, formed in a loop of the wire $a$ between the battery and coils.

By the above-described arrangement it will be seen that the single set of high-tension apparatus A B C is in proper condition for operating an induction-coil each time the interrupter $e$ or $e'$ operates, the induction-coil I being operated by the interrupter $e$ through the circuit $a$ from the primary $p$ to the battery A, thence by wire $a^2$ to the condenser, and through the vibrator B by the wires $a^{15}$, $a^{13}$, and $a^{10}$ to the other end of the primary $p$, while the same operation takes place for the coil I' through the circuit $p'$ $a$ A $a^2$ to the condenser C, thence by B $a^{15}$ $a^{14}$ $a^{12}$ back to $p'$.

It will be understood that any convenient means for operating the interrupters may be provided, the cam E herein shown being the usual cam geared to the main shaft of the engine to operate in unison with the required movements of the cylinder, and in using the same in connection with my invention I simply arrange the interrupters at proper intervals and in proper number, according to the kind of engine and number of cylinders to be operated.

In Fig. 2 I have shown an arrangement where each coil is provided with its own condenser, but all are operated by the same battery and vibrator, this being a desirable arrangement for application to certain well-known types of automobiles. I have shown three coils and spark-plugs, (although in all cases it will be understood that the series of coils and sparking devices may be varied to suit the special conditions,) the primaries $p$ $p'$ $p^2$ being connected, respectively, to condensers $C'$ $C^2$ $C^3$ at one end and at their other end by a wire $a^{16}$ to the battery A, the other ends of said condensers being connected by a wire $a^{17}$ to the opposite pole of the battery and the vibrator B being interposed from the same end of the battery by wires $a^{18}$ $a^{19}$, leading to the ends of the condensers adjacent the coils, interrupters $e$ $e'$ $e^2$ being interposed for the respective condensers.

These interrupters may be operated in any convenient manner—as, for instance, the same as shown in Fig. 1, from a cam E. The secondaries $s$ $s'$ $s^2$ of the several induction-coils may be grounded at one end, as indicated at $y$, where they are shown connected to the engine, and at their other ends they are separately connected to the respective spark-plugs P P' P², which are respectively provided for the cylinders $d$ $d'$ $d^2$ of the three-cylinder engine herein shown.

From the above arrangement it will be seen that the same operation as already described in Fig. 1 may take place, the circuit being completed successively by the respective interrupters, so that first one coil and plug and then another are discharged from the single battery and vibrator.

I do not intend to restrict myself in all respects to the particular arrangement herein shown, as many variations thereof will occur, in view of the foregoing disclosure, to those skilled in the art.

Having described my invention, what I claim as new, and desire to secure by Letters Patent, is—

1. In an electrical ignition apparatus for explosive-engines, a plurality of induction-coils, a sparking device for each coil, a source of electrical energy, a single vibrator, a separate circuit for each of said coils, an interrupter for each circuit, means for operating said interrupters dissimultaneously, and means for impressing on each circuit a condenser-discharge.

2. In an electrical igniter for explosive-engines, a plurality of induction-coils, a sparking device for each coil, a source of energy, a single vibrator and condenser, and means for discharging said single condenser successively in connection with said respective induction-coils.

In testimony whereof I have signed my name to this specification in the presence of two subscribing witnesses.

WILLARD E. DOW.

Witnesses:
GEO. H. MAXWELL,
J. ETHEL TARR.